United States Patent [19]

Rauch et al.

[11] Patent Number: 4,488,926

[45] Date of Patent: Dec. 18, 1984

[54] APPARATUS FOR SECURING A SYNTHETIC THERMOPLASTIC STRAP IN A BAND-LIKE FORM AROUND AN OBJECT

[75] Inventors: Manfred Rauch, Achern, Fed. Rep. of Germany; Wenzel Synek, Hofraim, Switzerland

[73] Assignee: Fromm AG, Spreitenbach, Switzerland

[21] Appl. No.: 416,553

[22] Filed: Sep. 10, 1982

[30] Foreign Application Priority Data

Sep. 22, 1981 [CH] Switzerland .......................... 100/81

[51] Int. Cl.$^3$ ......................... B32B 31/00; B31F 5/00; B65H 19/00; B65H 69/02

[52] U.S. Cl. ................................ 156/379.8; 156/494; 156/502; 156/580

[58] Field of Search ................. 156/73.5, 379.6, 379.8, 156/380.1, 494, 502, 510, 515, 580.2, 580.1, 580; 100/33 PB, 33 R

[56] References Cited

U.S. PATENT DOCUMENTS

| | | | |
|---|---|---|---|
| 4,096,019 | 6/1978 | Lehmann | 156/494 |
| 4,305,774 | 12/1981 | Wedeking et al. | 156/73.5 |
| 4,313,779 | 2/1982 | Nix | 156/73.5 |

*Primary Examiner*—Edward Kimlin
*Assistant Examiner*—Merrell Cashion
*Attorney, Agent, or Firm*—Toren, McGeady and Stanger

[57] ABSTRACT

Apparatus for securing a synthetic thermoplastic strap in a band-like form around an object includes a strap support with a clamping device, a stretching device, and a welding device cooperating with the strap support for holding, stretching, welding and cutting the strap. These various devices can be displaced from the surface of the strap support so that the strap can be inserted laterally onto the support. Strap guidance members are provided at the opposite ends of the strap support. One strap guidance member forms a part of the welding device and includes a guide member. The guide member is retractable away from the surface of the strap support during the welding operation so that it does not interfere with the movement of the strap parts being joined together.

10 Claims, 7 Drawing Figures

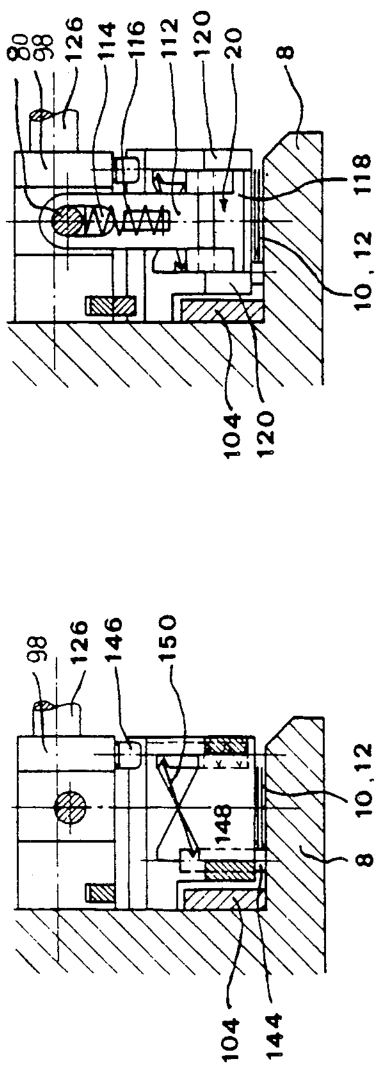
FIG. 7
FIG. 6
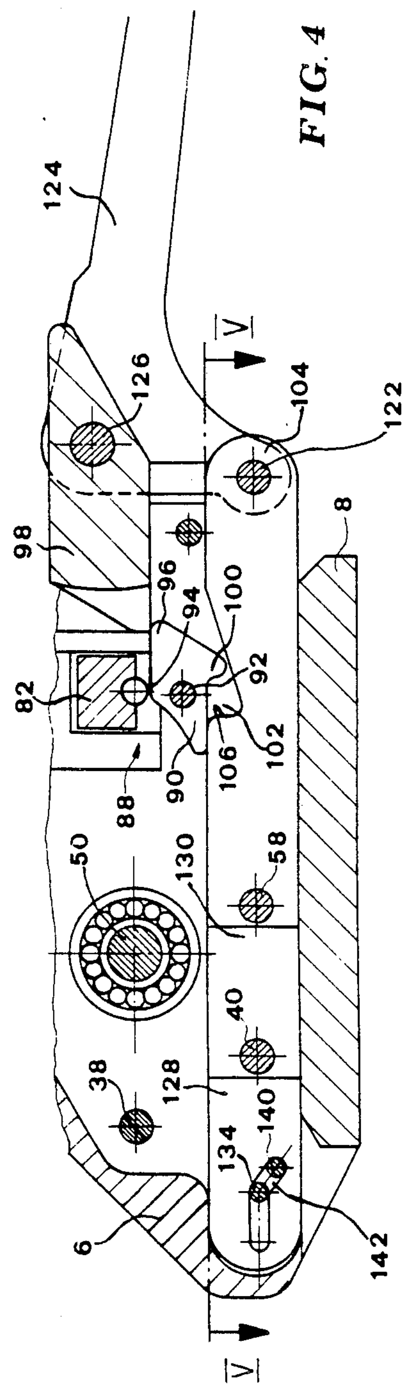
FIG. 4
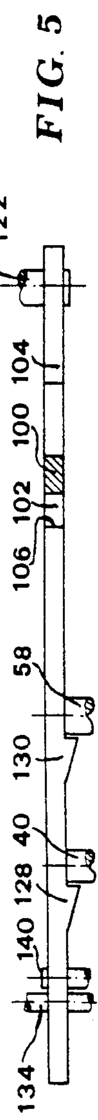
FIG. 5

APPARATUS FOR SECURING A SYNTHETIC THERMOPLASTIC STRAP IN A BAND-LIKE FORM AROUND AN OBJECT

SUMMARY OF THE INVENTION

The present invention is directed to an apparatus for securing a synthetic thermoplastic strap in a band-like form around an object and includes a band support with a clamping device, a stretching device, and a welding device cooperating with the strap support for securing overlapping strap parts together. These various devices are arranged relative to the strap support so that they can be moved to a position for inserting the strap parts onto the strap support in a direction extending transversely of the direction in which the strap parts extend over the strap support. Strap guidance members are located at the opposite ends of the strap support surface and one of the strap guidance members forms a part of the welding device.

An apparatus of this general type is disclosed in German Pat. No. 1 924 061 and in U.S. Pat. No. 4,313,779. In the German Patent there is a release device for lifting a swinging jaw after the welding operation has been completed for releasing the welded strap parts and for inserting new strap parts. A strap guidance member is coupled with the release device and is positioned in the strap guidance area when the swinging jaw is closed. This strap guidance member, however, has the serious disadvantage that it interferes with the welding operation. The swinging jaw is pivotably displaceable in a direction extending transversely of the direction of the strap parts over the support surface, the moving strap parts always strike the strap guidance member. To prevent this from happening, the strap guidance member must be made so wide that it is no longer effective.

Therefore, it is the primary object of the present invention to provide an apparatus of the general type mentioned above where the band guidance member does not have the indicated disadvantage.

In accordance with the present invention, the strap guidance member associated with the welding device includes a guide member positioned alongside the strap parts and retractable from the strap support surface while the welding procedure is carried out.

In the apparatus embodying the present invention, the strap guidance member is available particularly when the swinging jaw is in the release or displaced position, that is, when the strap parts are being inserted and when they are tensioned. Since the strap guidance member associated with the welding device is retracted when the welding operation is performed, the guidance member does not interfere with the welding operation and it is possible to adjust the strap guidance member very precisely relative to the strap parts so that very exact alignment and guidance are possible, since the guidance member is operative only during insertion and tensioning. Accordingly, it is possible to weld the strap parts together due to their exact alignment so that not only is an attractive joint formed, but the connection has especially good physical properties.

Advantageous embodiments of the apparatus are described in the claims.

The guide member can be retracted or moved away from the surface of the strap support in different ways. In one embodiment the guide member is displaced by a release device. An actuating lever cooperates with the release device. An actuating bolt is biased against the actuating lever by a spring. The guide member is coupled with the actuating bolt by a rocker. The guide member is in the form of a guide bolt.

To attain perfect guidance and welding of the overlapping strap parts a two-sided band guidance member is associated with the clamping device at one end of the strap support. This band guidance member is located on the side of the strap support from which the strap parts are positioned and it is retractable to afford placement of the strap parts on the support.

In a simple arrangement, the stretching device includes a lever mounted on a driven eccentric for securing a clamping jaw against the strap support.

There are a variety of possible arrangements of the welding device. One especially simple arrangement includes a swinging jaw positioned on one end of a two-armed lever while the other end of the lever is coupled to a driven eccentric. The two-armed lever is supported on a rotating shaft and is biased by a spring so that the swinging jaw is pressed toward the strap support. The welding device includes a release device with a pawl which in the open position engages the rotating shaft and limits its movement. The pawl can be disengaged from the rotating shaft by an actuating lever. There are also a number of different arrangements for the clamping device. The apparatus includes a housing on which a lever is supported with the lever directed in the strap stretching direction and biased toward the strap support. The clamping jaw is pivoted to the lever for holding the strap parts on the strap support.

Different cutting devices can be incorporated into the apparatus. In a simple embodiment, a knife holder is secured to the welding device. A spring biases the knife holder toward the strap support. A knife is held in the knife holder in a guidance arrangement so that it cannot be moved transversely of the strap direction over the strap support. For the insertion of the strap parts into position on the strap support the individual devices cooperating with the support must be retracted. The retraction or displacement of the various devices is effected by a release slide connected with a manual lever so that the slide can be moved along the strap support. The release slide is connected to the various devices so that when the manual lever is actuated the devices are displaced from the operating position into the open position.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 4 is a partial sectional view taken along the line IV—IV in FIG. 2 showing the release slide and manual lever;

FIG. 5 is a view of the release slide taken along the line V—V in FIG. 4;

FIG. 6 is a sectional view taken along the line VI—VI in FIG. 1 illustrating the band guidance member formed as a part of the welding device; and FIG. 7 is a sectional view taken along the line VIII—VIII in FIG. 1 exhibiting the cutting device of the apparatus.

DETAILED DESCRIPTION OF THE INVENTION

Figure 1:
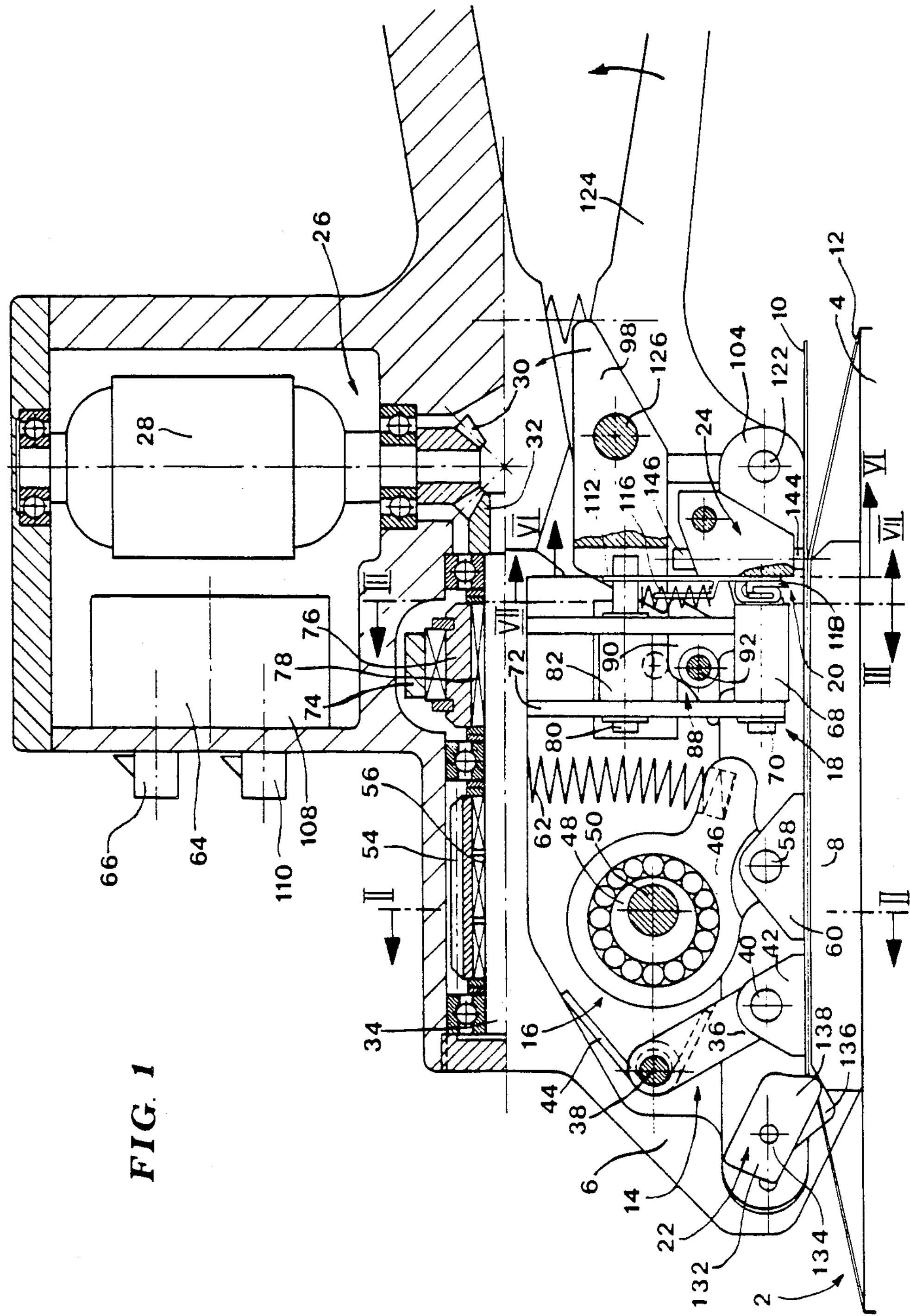
FIG. 1 is a side view, partly in section, taken along the line I—I in FIG. 2 with the front plate of the apparatus removed.

In the drawing an apparatus is illustrated for securing a synthetic thermoplastic strap 2 around an object 4, only the upper part of the object is shown in FIG. 1. The apparatus includes a casing or housing 6 forming a strap support 8 on which overlapping strap parts 10, 12 are positioned so that the strap 2 forms a loop around the object 4. Cooperating with the strap support 8 are a clamping device 14, a strap stretching device 16, a strap welding device 18, and a cutting device 20. As viewed in FIG. 1 the strap support 8 has a first end located at the left and a second end located at the right. The clamping device 14 is located adjacent the first end followed, in turn, by the stretching device 16, the welding device 18 and the cutting device. At the first end a first band guidance member 22 forms a part of the clamping device and at the second end a second band guidance member 24 forms a part of the welding device. A driving mechanism 26 is located within the housing upwardly from the support 8 and includes a driving motor 28 reversible in its direction of rotation. As can be seen in FIG. 1, the motor 28 drives bevel gears 30, 32. These gears drive a shaft 34, and the strap stretching device 16 and the welding device 18 are connected to the shaft.

At the first end of the strap support 8, the clamping device includes a lever 36 pivotally supported on a pin 38 secured to the housing 6 and the lever extends downwardly from the pin in the direction toward the second end of the strap support, that is in the strap stretching direction. At the lower end of the lever 36 a clamping jaw 42 is pivotally mounted on another pin 40. Spring 44 extending around the pin 38 biases the lever 36 and with it the clamping jaw 42 against the strap support 8.

Figure 2:
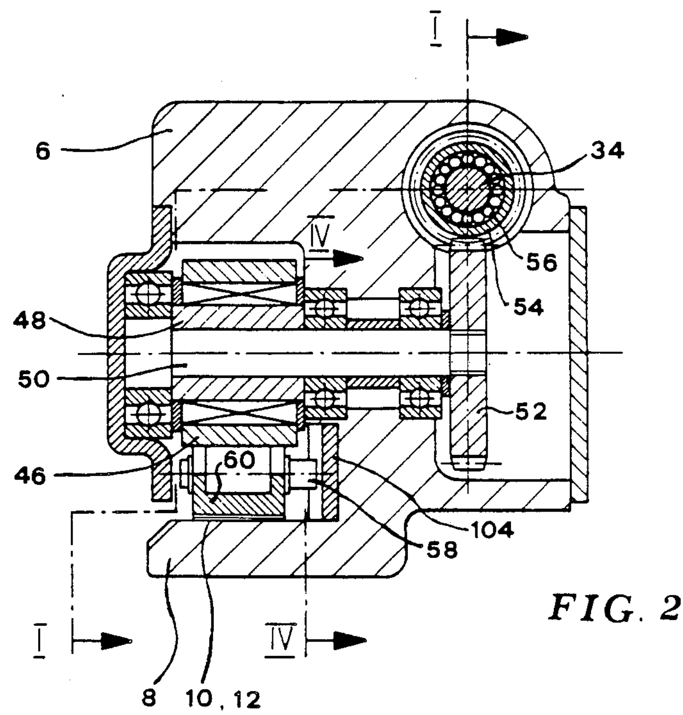
FIG. 2 is a sectional view taken along the line II-13 II in FIG. 1 illustrating the stretching device of the apparatus.

Alongside the clamping device and closer to the second end of the strap support is the stretching device 16. Stretching device 16 includes a lever 46 having one end pointing in the strap stretching direction with its other end mounted on a driven eccentric 48. Eccentric 48 is positioned on a shaft 50 and is connected via worm gears 52, 54, note FIG. 2, with the shaft 34 of the driving mechanism 26. Worm gear 54 positioned on the shaft 34 is coupled by a free wheeling clutch 56 to the shaft 34. The lower side of the lever 46 has a pin 58 on which a clamping jaw 60 is positioned. A spring 62 biases the lever 46 downwardly so that the clamping jaw 60 is pressed against the strap support 8. Within the housing 6 above the shaft 34 there is a control mechanism 64 for adjusting the desired strap tension. This control mechanism responds to the current consumption of the driving motor 28. A specific current consumption is assigned to a specific band tensioning value. The control mechanism 64 includes a control member 66 for operating the motor 28 so that it can be cut off at a specific current consumption corresponding to a specific strap tension value.

Figure 3:
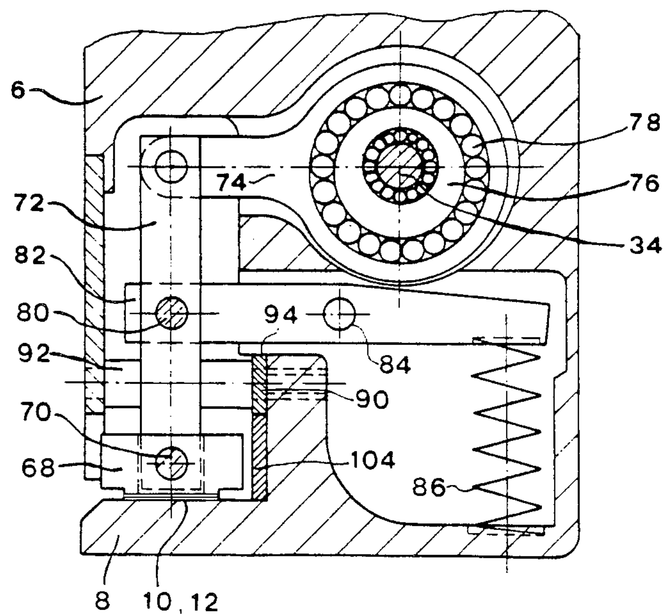
FIG. 3 is a sectional view taken along the line III—III in FIG. 1 displaying the welding device of the apparatus.
Figure 8:
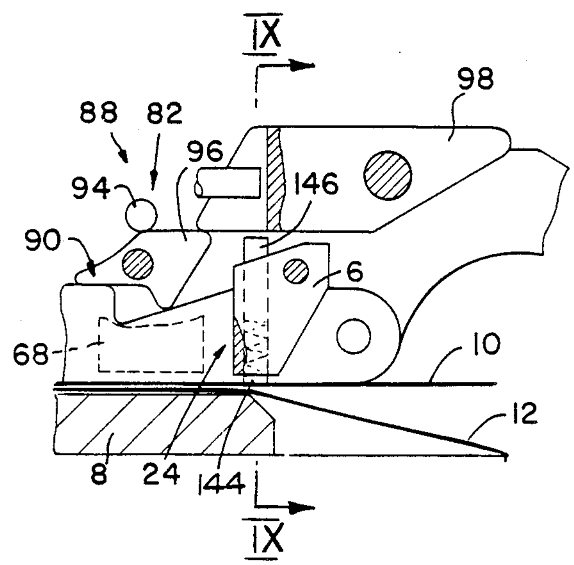
Figure 9:
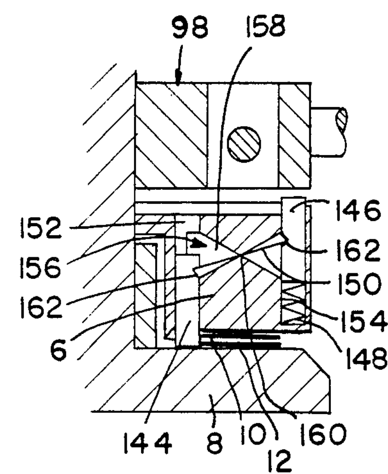
Figure 10:
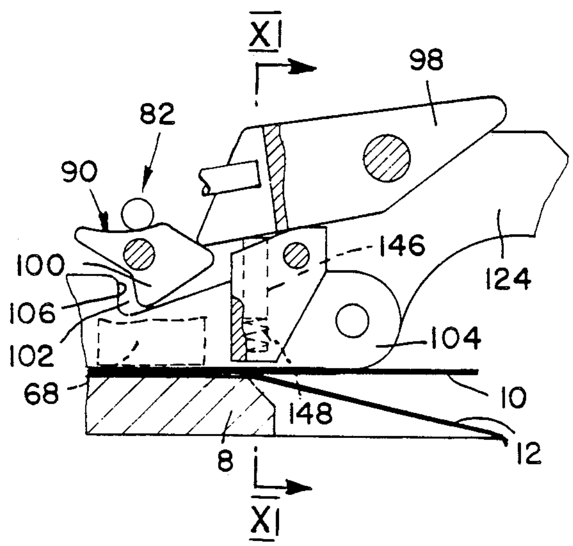
Figure 11:
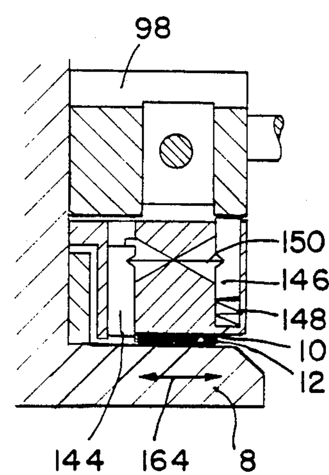

Following the stretching device 16 in the strap stretching direction over the strap support is the welding device which includes a swinging jaw 68 arranged to pivot in the direction extending transversely of the first end-second end direction, that is, the direction in which the band extends over the support 8. Swinging jaw 68 is pivotally supported on an axle 70 located at the lower end of a two-armed lever 72 constructed as a double lever. The axle 70 extends in the first end-second end direction of the strap support 8 so that the swinging jaw 68 pivots transversely of the first end-second end direction. The upper end of the lever 72 is coupled by a connecting member 74 with a driven eccentric 76. Eccentric 76 is connected by a freewheeling clutch 78 to the shaft 34. Freewheeling clutch 78 acts opposite to the freewheeling clutch 56 of the stretching device 16 so that, depending on the direction of rotation of the driving motor 28 and the rotation of the shaft 34, either the stretching device 16 or the welding device 18 is actuated. The two-armed lever 72 is articulated by a pin 80 to a rocking lever 82 pivotally supported in the housing 6 by a bolt 84, note FIG. 3. At the opposite end of the rocking lever 82 from the two-armed lever 72, a spring 86 bearing against the housing 6 biases the rocking lever and presses the two-armed lever 72 downwardly so that the swinging jaw 68 at its lower end is pressed against the strap support 8.

Welding device 18 includes a release device 88 for holding the swinging jaw 68 in the open position as shown in FIG. 1. In the open position, swinging jaw 68 is spaced upwardly from the strap support 8 so that the strap parts 10, 12 can be positioned on the strap support and to enable the strap parts to be stretched or tensioned by the stretching device 16 without any interference from the welding device 18. As shown best in FIG. 4, the release device 88 includes a pawl 90 pivotally supported on a pin 92 attached to the housing 6. Pawl 90 has a control stop 94 located above pin 92 and the stop contacts the rocking lever 82 and lifts it into the open position. Further, pawl 90 has a shoulder 96 disposed in contact with an actuating lever 98. When the actuating lever is operated, it acts against the shoulder 96 and pivots the pawl 90 so that the rocking lever 82 is released with the swinging jaw moving into the operating position bearing against the strap parts 10, 12 on the strap support, note FIG. 3. The lower side of the pawl 90 as viewed in FIG. 4 has a projection 100 engageable within a recess 102 in a release slide 104 which is to be described later. Recess 102 has a stop surface 106 which contacts the projection 104 during movement of the release slide and pivots the pawl into the release position so that the control stop 94 lifts the rocking lever 82 into the open position.

The welding device 18 is also equipped with a control mechanism 108 which has a control member 110 so that the operating period of the driving motor 28 in the rotational direction for operating the welding device can be set. The duration of the operation of the driving motor determines the welding together of the strap parts 10, 12.

Adjacent the second end side of the welding device 18 is the cutting device 20. Cutting device 20 is connected to the welding device 18 and is moved between the cutting or operating position and the open position by the swinging jaw 68. Cutting device 20 has a knife holder 112 with an oblong hole 114. The knife holder is suspended on a hinge pin 80 extending through the oblong hole. The hinge or pivot pin 80 extends through the rocking lever 82 and through the two-armed lever 72. A spring 116 extends between the pivot pin 80 and the knife holder 112 and biases the knife holder toward the strap support 8. A knife 118 is located in the lower end of the knife holder. In the open position, the knife 118 projects downwardly beyond the swinging jaw 68. A stationary vertical guidance unit 120 permits the vertical movement of the knife holder 112 and the knife 118, however, it prevents any movement of the knife holder and knife in the direction transversely of the first end-second end direction. As a result, the knife does not move in the operating position and is biased against the upper strap part 10. The cutting operation is effected by the transverse movement of the upper strap 10 caused by the action of the swinging jaw 68 of the welding device when the strap parts are being joined together.

As mentioned above, release slide 104 moves the clamping jaw 42 of the clamping device 14, the clamping jaw 60 of the stretching device 16 and the swinging jaw 68 of the welding device 18 from the operating position into the open position of the apparatus so that the strap part 10, 12 can be positioned on the straps support 8. Accordingly, release slide 104 is supported in the housing 6 so that it slides along the surface of the strap support 8. Adjacent to the second end of the strap support 8, the release slide 104 is connected by a pin 122 to manual lever 124. Lever 124 is pivotally supported about a bolt 126 secured to the housing 6. As can be seen best in FIG. 5, shoulders 128, 130 extend outwardly from one side of the release slide and interact with laterally projecting pins 40, 58 of the clamping jaw 42 and the clamping jaw 60, respectively. Shoulders 128, 130 do not interfere with the pivotal movement of the clamping jaw 42 or the clamping jaw 60 when the release slide is in the operative position. When the manual lever 124 is activated, the release slide 104 moves in the release direction, that is toward the second end of the strap support 8, and the shoulders 128, 130 displace the pins 40, 58 so that the corresponding jaws 42, 60 are lifted upwardly from the strap support 8.

At the first end of the strap support 8, first strap guidance member 22 faces the clamping device 14 and includes a guide stirrup 132 which is pivotally mounted on a pin 134 secured to the housing 6. Guide stirrup 132 is open toward the strap support 8. The guide stirrup 132 has a side 136 on the opposite side of the strap parts from the side of the strap support over which the strap parts are inserted. Side 136 projects toward the strap support 8 more than the stirrup side 138 closer to the side of the strap support over which the strap parts are inserted. Side 136 has an engagement member 140 directed toward the housing 6 and engaged within a guidance slot 142 extending obliquely of the direction of the release slide 104. When the release slide 104 is moved, the guide stirrup 132 is lifted by the engagement member 140 positioned in the slot 142 so that the side 138 is lifted upwardly from the strap support 8 and the strap parts 10, 12 can be inserted over the strap support and in contact with the inner side 136.

At the second end of the strap support 8, the second strap guidance member 24 is located adjacent to the welding device 18. Second strap guidance member 24 has a guide member 144 located inwardly of the strap parts from the side of the strap support over which the strap parts are inserted. Note the position ot the guide member 144 shown in FIG. 6. Guide member 144 is retractable upwardly from the strap support 8 during the welding operation. Accordingly, the second band guidance member 24 is coupled with the release device 88 of the welding device 18 so that, when the release device moves to the open position, the guide member 144 is returned downwardly toward the strap support 8. The second band guidance member 24 has an actuating bolt 146 supported in the housing 6 and it is biased by a spring 148 toward the actuating lever 98 of the release device 88. Actuating bolt 146 is coupled with the guide member 144 by a rocker 150 supported in the housing 6. When the actuating lever 98 is moved for releasing the pawl 90, at the same time it presses the actuating bolt 146 against the force of the spring 148. At the same time, the rocker 150 displaces the guide member 144 upwardly from the strap support 8 so that the upper strap part 10 which is acted on by the swinging jaw is not obstructed during the welding process,that is, there is not interference with the transverse movement of the upper strap while the strap parts are being welded together.

When the strap 2 is to be banded about the object 4 the apparatus is in the open position so that the upper strap part 10 and the lower strap part 12 can be placed on the strap support 8 being inserted transversely of the first end-second end direction of the support. As can be seen in FIGS. 6 and 7, the right-hand side of the strap support 8 open so that the strap parts can be located on the strap support. The strap parts are aligned by the first and second guidance members 22, 24. After the clamping device 14 secures the strap parts against the strap support 8, the driving motor is set in operation so that it rotates in the direction for operating the stretching device 16. When the stretching device tensions the strap 2 around the object 4 to the desired extent, the control mechanism 64 via control member 66 switches off the driving motor 28. When actuating lever 98 is moved in the opposite direction, the welding device 18 is released by the release device 88 so that the swinging jaw 68 moves into the operating position bearing against the strap parts 10, 12. At the same time the driving motor 28 is switched on in the opposite direction by the control mechanism 64 and operates the welding device 18. The direction of this operation is adjustable by the control member 110. When the welding device is placed in operation, the guide member 144 of the second guide member 24 is lifted upwardly from the side of the strap parts and from the strap support 8 so that the swinging jaw 68 can move the upper strap part 10 transversely of the first end-second end direction of the strap support 8 for effecting the welding of the strap parts together without any interference from the guide member 144.

During the welding operation the back and forth movement of the upper strap part 10 against the cutting blade 118 separates the ends of the upper band part 10 from the remaining band formed by the strap 2 extending around the object 4. With the strap connected in a loop around the object, the various devices can be moved via the release slide 104 into the open position so that the apparatus can be removed from the banded object for effecting another connection of the strap parts.

While specific embodiments of the invention have been shown and described in detail to illustrate the application of the inventive principles, it will be understood that the invention may be embodied otherwise without departing from such principles.

We claim:

1. Apparatus for securing a synthetic thermosplastic strap in a band-like form around an object comprising a strap support including a strap support surface extending between a first end and a second end of said support and said strap support being arranged to afford access in the direction extending transversely of the first end-second end direction to said strap support surface for placing overlapping strap parts extending in the first end-second end direction on said strap support surface so that the strap parts can be secured together, a clamping device positioned above said band support surface adjacent the first end thereof and arranged to hold the strap parts on said strap support surface, a stretching device located above said strap support surface between said clamping device and the second end of said band support and arranged to stretch and tension the strap parts, a welding device including a swinging jaw located between said stretching device and the second end of said strap support and positioned above the strap support surface, said welding device arranged to cooperate with said strap support in welding the strap parts together, said swinging jaw is pivotally mounted above an axis extending in the first end-second end direction so that said swinging jaw pivots in a path extending transversely of the first end-second end direction between an operating position and an open position, said welding device includes a release device for holding said swinging jaw in the open position, a first strap guidance member located adjacent the first end of said strap support and a second strap guidance member located adjacent to the second end of said strap support for guiding the strap parts, and said second end strap guidance member includes a guide member for guiding the sides of the strap parts positioned inwardly of the strap parts from the direction in which they are positioned on said strap support, means for directing said guide member in a direction toward said strap support surface, and means for retracting said guide member in a direction away from said strap support surface when said welding device is in the operating position.

2. An apparatus, as set forth in claim 1, wherein said second strap guidance member is coupled with said release device for said welding device so that when said release device is actuated for placing said welding device in the operating position said guide member is retracted from said strap support surface.

3. An apparatus, as set forth in claim 2, wherein an actuating lever is positioned for moving said release device so that said welding device is moved into the operating position, said second strap guidance member includes an actuating bolt spring-biased against said actuating lever, a rocker coupling said actuating bolt with said guide member whereby when said welding device is moved into the operating position said guide member is retracted from said strap support surface, and said guide member is in the form of a guide bolt.

4. An apparatus, as set forth in claim 1, wherein said first strap guidance member includes a first side and a second side arranged so that said first and second sides are on the opposite sides of the strap parts for guiding said strap parts on said strap support surface, and said first side located closer to the side of said strap support over which the strap parts are inserted onto said strap support surface is displaceable upwardly from said strap support surface.

5. An apparatus, as set forth in claim 4, wherein said first strap guidance member includes a guide stirrup with said first and second sides forming the opposite sides of said guide stirrup, said guide stirrup being open in the direction facing toward said strap support surface, said stirrup is pivotally supported for movement upwardly away from said strap support surface, and said second side of said guide stirrup spaced inwardly from the first said projects further toward said band support surface than said first side.

6. An apparatus, as set forth in claim 1, wherein said stretching device includes a driven eccentric, a lever mounted on said driven eccentric, said lever extending from said driven eccentric toward the second end of said strap support surface which is in the strap stretching direction, a clamping jaw pivotally connected to said lever, and means for biasing said clamping jaw toward said strap support surface.

7. An apparatus, as set forth in claim 1, including a housing, a two-armed lever positioned within said housing and extending upwardly from said band support surface, said two-armed lever having a first end adjacent said strap support surface and a second end spaced upwardly from said strap support surface, a driven eccentric located within said housing and said two-armed lever coupled with said driven eccentric, said swinging jaw pivotally connected to the first end of said two-armed lever, a rocking lever positioned within said housing and supporting said two-armed lever, means biasing said rocking lever for pressing said swinging jaw toward said strap support surface, said release device includes a pawl arranged to engage said rocking lever when said welding device is in the open position, an actuating lever mounted in said housing and in engagement with said pawl so that said actuating lever displaces said pawl releasing said rocking lever for displacing said welding device into the operating position.

8. An apparatus, as set forth in claim 1, including a housing, said clamping device located within said housing, said clamping device includes a lever pivotally supported on said housing with said lever extending downwardly from its pivotal support on said housing toward said strap support surface and toward the second end of said strap support, and a clamping jaw pivotally mounted on the lower end of said lever for engagement with the strap parts positioned on said strap support surface.

9. An apparatus, as set forth in claim 7, including a cutting device for the upper strap part positioned on said strap support surface, said cutting device includes a knife holder, said knife holder having an oblong hole extending in the direction upwardly from said support surface, a pin positioned in said housing and extending through said oblong hole, said pin extends through said two-armed lever and said rocking lever, means for biasing said knife holder toward said strap support surface, a knife secured in said knife holder, and means for vertically guiding said knife holder and said knife and for preventing the movement of said knife transversely of the first end-second end direction of said strap support.

10. An apparatus, as set forth in claims 1, 2, 3, 4, 5, 6, 7, 8 or 9, including a release slide extending in the first end-second end direction of said strap support, said release slide is slidable along said strap support surface, a manual lever connected to one end of said release slide, said release slide is engageable with said first strap guidance member said clamping device, said stretching and said release device of said welding device, and when said manual lever is operated said release slide is displaced in the first end-second end direction of said strap support for moving said first strap guidance member, said clamping device, said stretching device, and said welding device into the open position spaced upwardly from said strap support surface, and said pawl on said release device has a projection thereon arranged in the operating position to contact a stop on said release slide with said stop being effective when said release slide is moved in the release direction.

* * * * *

UNITED STATES PATENT AND TRADEMARK OFFICE

CERTIFICATE OF CORRECTION

PATENT NO. : 4,488,926

DATED : December 18, 1984

INVENTOR(S) : Manfred Rauch & Wenzel Synek

It is certified that error appears in the above-identified patent and that said Letters Patent is hereby corrected as shown below:

In the heading of the Patent, it should read as follows:

-- [30] Foreign Application Priority Data

Sep. 22, 1981 [CH] Switzerland .......... 6 100/81 --

Signed and Sealed this

*Third* Day of *September 1985*

[SEAL]

*Attest:*

DONALD J. QUIGG

*Attesting Officer* *Acting Commissioner of Patents and Trademarks - Designate*